United States Patent
Hussain

(10) Patent No.: US 12,257,482 B2
(45) Date of Patent: Mar. 25, 2025

(54) SYSTEMS AND METHODS FOR PRODUCING A SPORTS BALL

(71) Applicant: Ali Hasnain Hussain, Richmond Hill (CA)

(72) Inventor: Ali Hasnain Hussain, Richmond Hill (CA)

(*) Notice: Subject to any disclaimer, the term of this patent is extended or adjusted under 35 U.S.C. 154(b) by 0 days.

(21) Appl. No.: 18/759,971

(22) Filed: Jun. 30, 2024

(65) Prior Publication Data

US 2024/0416186 A1   Dec. 19, 2024

Related U.S. Application Data

(60) Provisional application No. 63/651,415, filed on May 24, 2024.

(51) Int. Cl.
*A63B 45/00* (2006.01)
*A63B 41/08* (2006.01)
*B29D 22/04* (2006.01)

(52) U.S. Cl.
CPC .............. *A63B 45/00* (2013.01); *A63B 41/08* (2013.01); *B29D 22/04* (2013.01)

(58) Field of Classification Search
None
See application file for complete search history.

(56) References Cited

U.S. PATENT DOCUMENTS

| | | | |
|---|---|---|---|
| 2012/0234467 A1* | 9/2012 | Rapaport | B32B 27/306 156/145 |
| 2015/0087442 A1* | 3/2015 | Ichikawa | C08K 3/22 473/376 |
| 2015/0165277 A1* | 6/2015 | Ono | B23K 26/083 219/121.78 |
| 2021/0402263 A1* | 12/2021 | Ou | A63B 45/00 |

* cited by examiner

*Primary Examiner* — Farah Taufiq
(74) *Attorney, Agent, or Firm* — Bajwa IP Law Firm; Haris Zaheer Bajwa

(57) ABSTRACT

A method for forming a plurality of panels, which may comprise cutting a plurality of outer layers cutouts corresponding to a respective shape for each of the plurality of panels, applying indentation on foams of each of the plurality of panels, placing them in respective corresponding mold and applying pressure to each of the corresponding molds for thirty to forty seconds to form finalize panels. Method may further comprise forming a pre-finalized ball by attaching the plurality of the panels including the bladder valve panel to a bladder and respective edges to each of the plurality of the panels to respective edges of adjacent panels of the plurality of the panels, and placing the pre-finalized sports ball in a mold and applying heat to the pre-finalized sports ball.

7 Claims, 21 Drawing Sheets

FIG 700
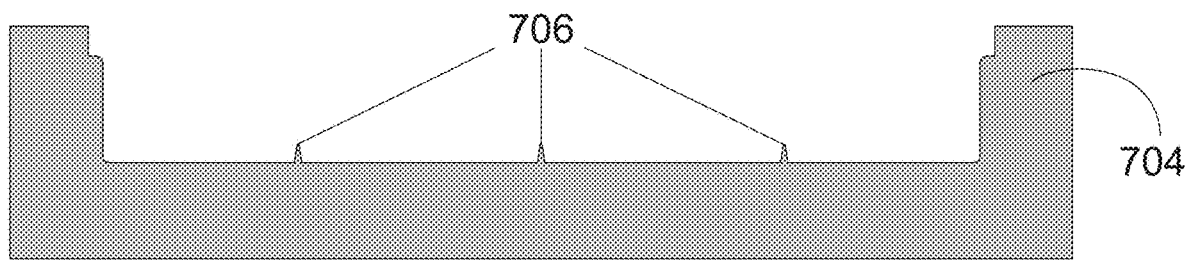
FIG.7A
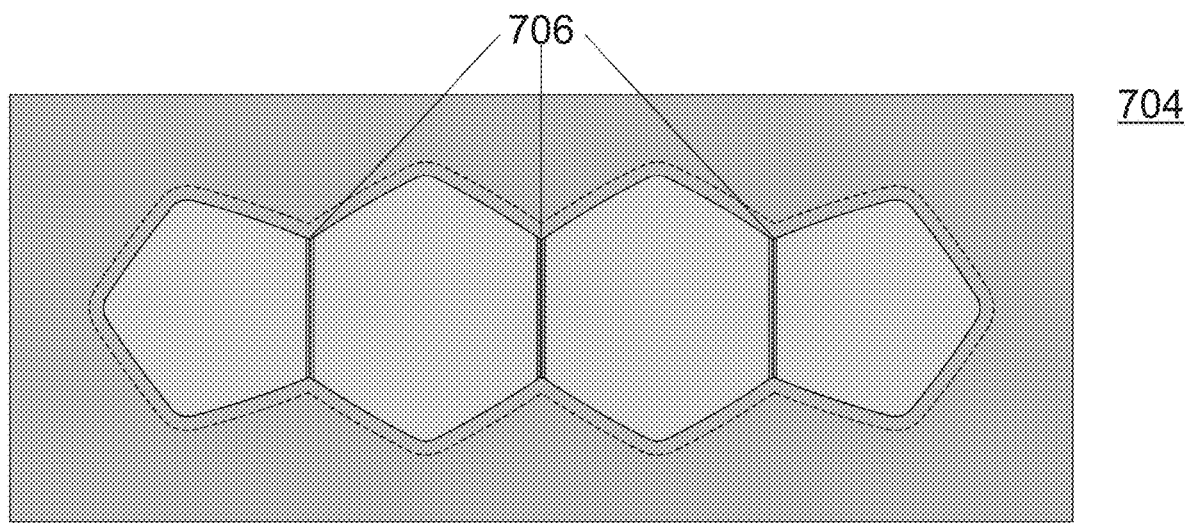
FIG.7B

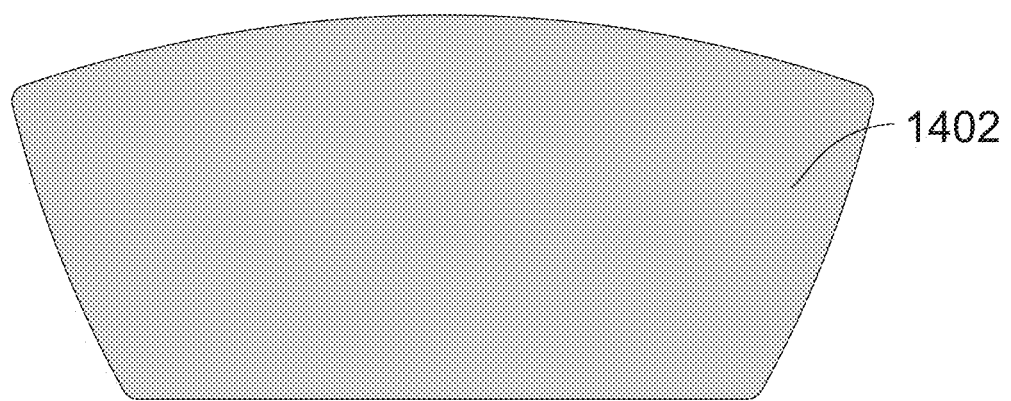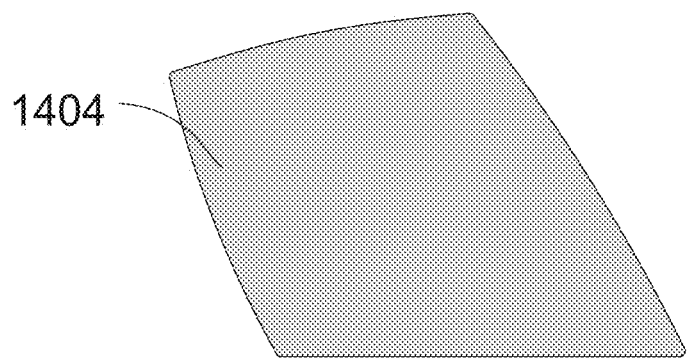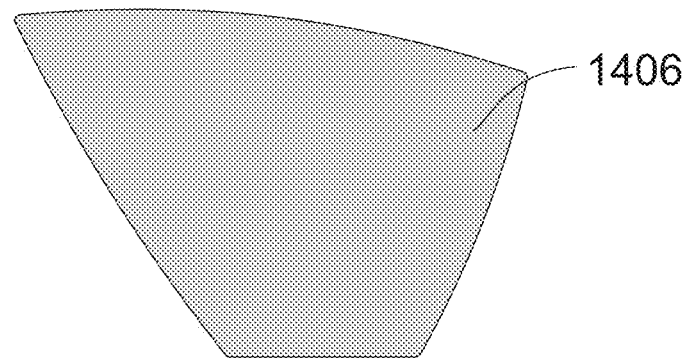
FIG.14A

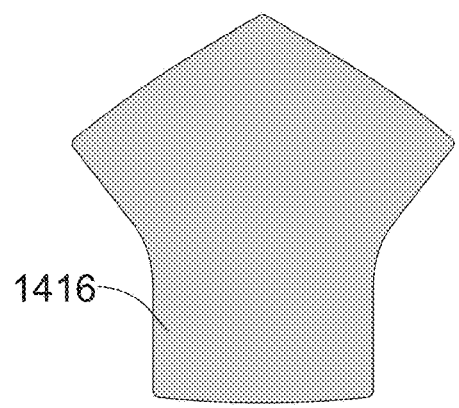
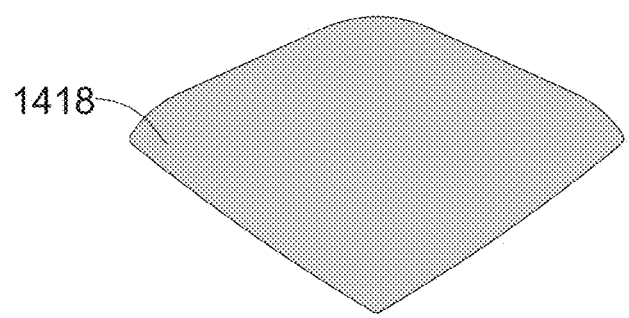
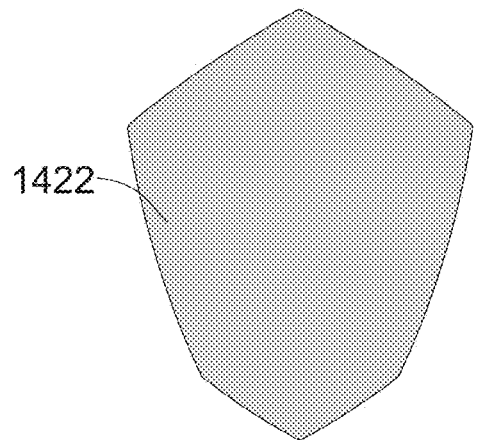
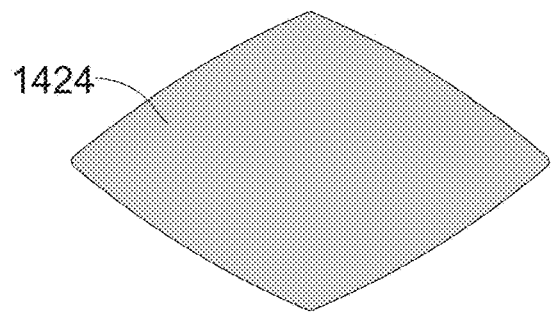
FIG.14C

SYSTEMS AND METHODS FOR PRODUCING A SPORTS BALL

PRIORITY INFORMATION

The This application is a non-provisional application of Provisional Patent Application No. 63/651,415, filed on May 24, 2024, entitled "Systems and Methods for Producing a Sports Ball," which is incorporated herein by reference in its entirety.

TECHNICAL FIELD

The present disclosure relates generally to a ball and a method for manufacturing a ball. More particularly, and without limitation, the present disclosure relates to structures and methods for manufacturing a sports ball.

BACKGROUND

Conventional thermos-bonded sports balls with internal bladder have numerous drawbacks including required numerous complicated steps in their manufacturing taking longer time and creating unnecessary wastage during these numerous processes and investment in machinery for every step of manufacturing. Therefore, for increasing manufacturing capacity, there is a need for significantly increasing manpower and cost.

Exemplary embodiments, consistent with the present disclosure, therefore, aim to resolve the aforementioned problems including allowing for the same quality and consistency of balls during usage but allowing for more cost-effective and time effective manufacturing mechanisms, among others.

SUMMARY

An object of the invention is to provide a new and improved sports ball having a high performance, synthetic leather balls that are of high quality but are manufactured utilizing exemplary approaches, providing high durability while also providing manufacturing cost-efficiency in terms of time and costs.

In an exemplary embodiment, a manufacturing method of a sports ball is provided. Exemplary methods comprise the steps of a manufacturing method of a sports ball, comprising the steps of forming a plurality of panels, comprising forming an outer layer for the plurality of panels, comprising forming the outer layer by attaching foam to a Polyurethane (PU) layer, forming cutouts corresponding to a respective shape for each of the plurality of panels from the outer layer, forming pre-mold cutouts by creating one or more foam indentations on each of the respective cutouts by applying a laser to the foam of each respective cutout. forming each respective panel of the plurality of panels by placing each of the pre-mold cutouts in a corresponding mold, wherein a shape of the corresponding mold corresponds to a shape of a finalized panel, a mold comprising of an upper mold portion and a lower mold portion, the lower mold portion comprising a cavity in a desire shape of a respective panel, the upper mold portion comprising a pressing part corresponding to shape of the cavity. And forming each respective panel in each respective corresponding mold by applying pressure utilizing the upper mold portion applying heat for thirty to forty seconds. In an exemplary embodiment, the method may further comprise creating a bladder valve panel by inserting a valve in one of the plurality of created panels, forming a pre-finalized ball by attaching the plurality of the panels including the bladder valve panel to a bladder and respective edges to each of the plurality of the panels to respective edges of adjacent panels of the plurality of the panels, and placing the pre-finalized sports ball in a mold and applying heat to the pre-finalized sports ball, wherein the applying heat to the pre-finalized sports ball comprises applying 70 degrees Celsius for thirty seconds to sixty seconds.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

FIGS. 14A-C illustrated exemplary panel shapes that may form an outer covering of an exemplary soccer ball, consistent with one or more exemplary embodiments of the present disclosure.

DETAILED DESCRIPTION

A sports ball is traditionally made up of two major components, a bladder for air and a cover of panels. Embodiments consistent with the present disclosure enhance the performance of a sports ball by providing a method and structure for efficiently utilizing manufacturing techniques for forming sports balls. Specifically, exemplary embodiments provide for utilizing unique methods to form unique structures which allow for efficient produced thermo-bonded balls, in terms of monetary and time resources.

Figure 1A:
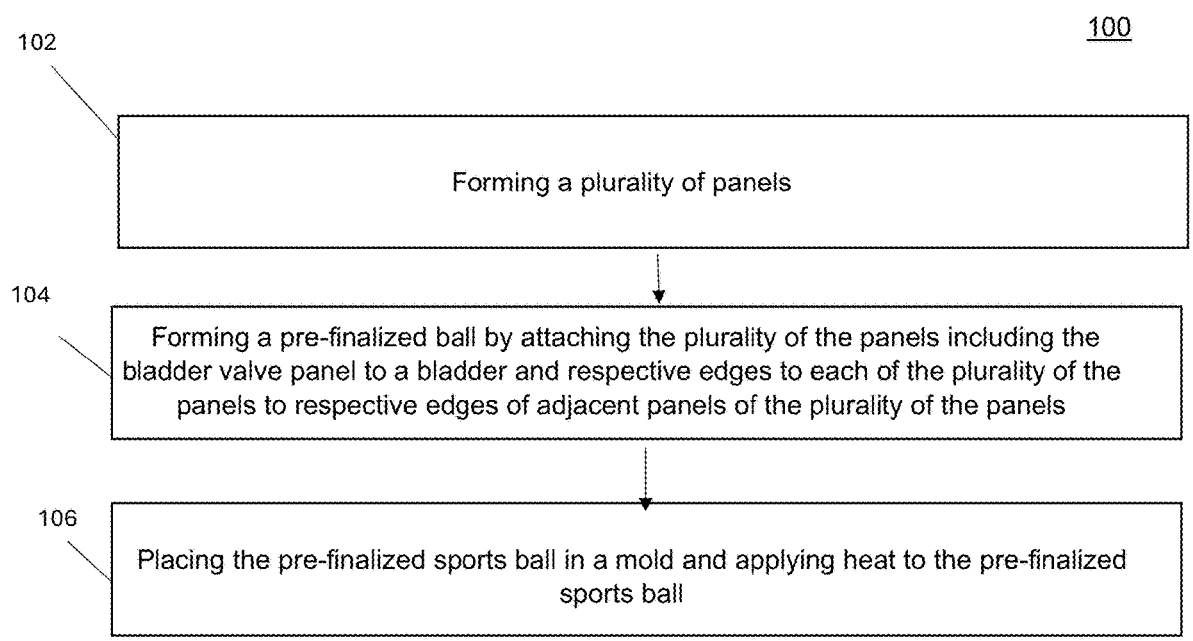
FIG. 1A illustrates an exemplary method for manufacturing a sports ball, consistent with one or more exemplary embodiments of the present disclosure.

FIG. 1A illustrates an exemplary method 100 for manufacturing a sports ball, consistent with one or more exemplary embodiments of the present disclosure.

With further details, with respect to method 100, step 102 may comprise of forming a plurality of panels, consistent with one or more exemplary embodiments of the present disclosure.

Figure 1B:
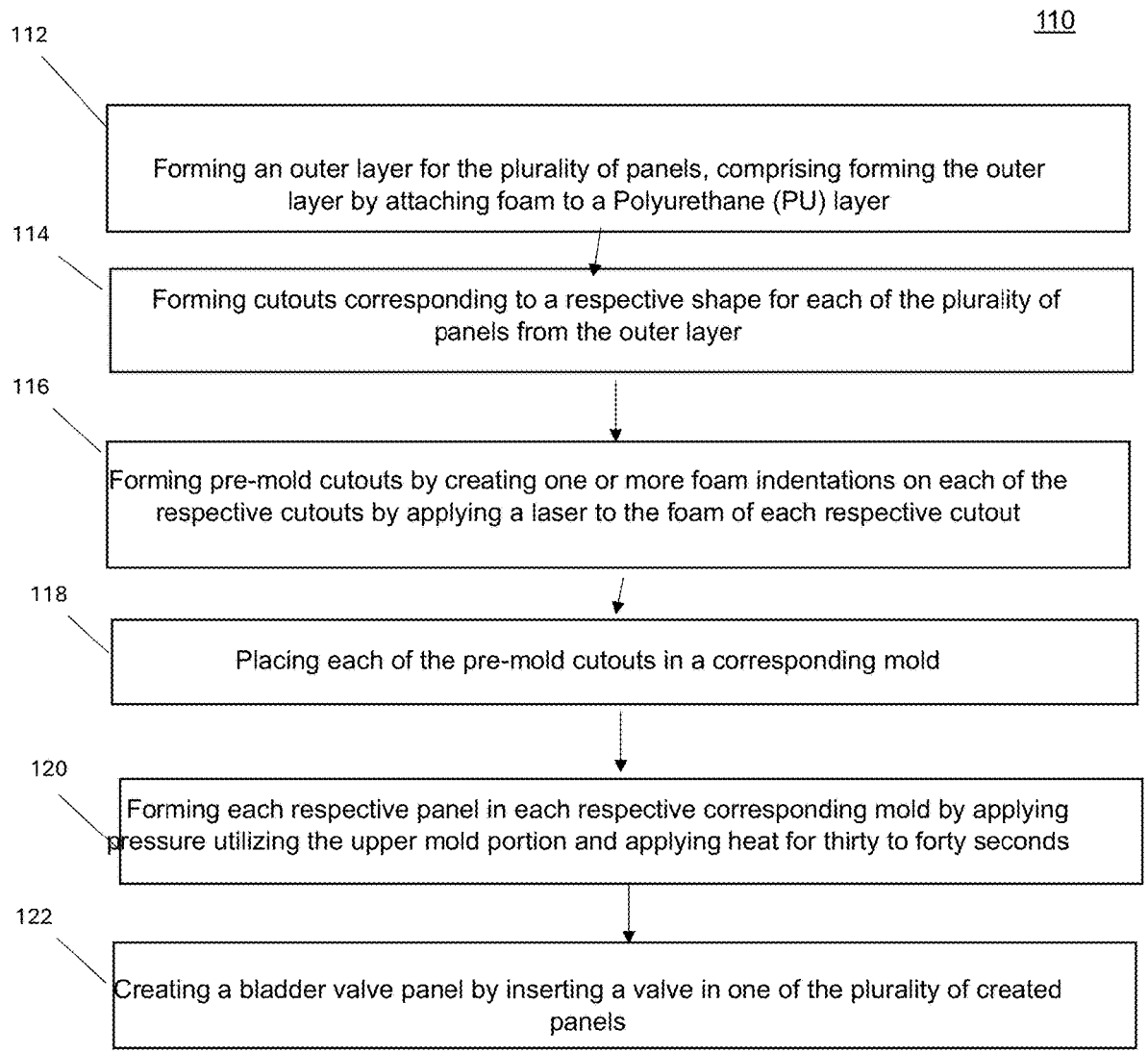
FIG. 1B illustrates an exemplary method for forming a plurality of panels, consistent with one or more exemplary embodiments of the present disclosure.

In an exemplary embodiment, FIG. 1B illustrates flowchart 110 comprising details of step 102.

In an exemplary embodiment, step 112 may comprise of forming an outer layer for the plurality of panels, comprising forming the outer layer by attaching foam to a Polyurethane (PU) layer. In an exemplary embodiment, an exemplary outer later may be formed by attaching exemplary foam to a PUL layer utilizing latex.

Figure 2:
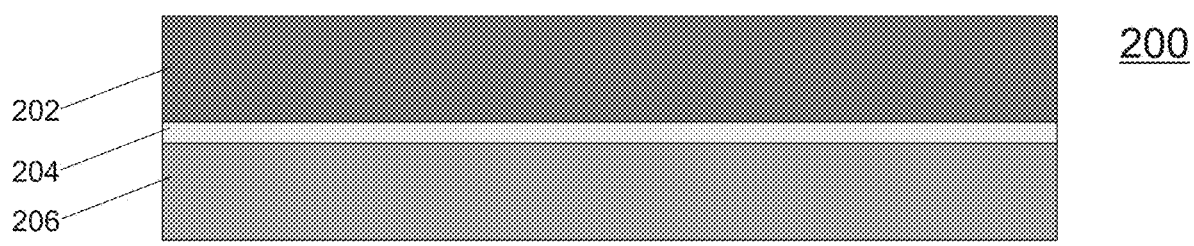
FIG. 2 illustrates an exemplary outer layer, consistent with one or more exemplary embodiments of the present disclosure.

In an exemplary embodiment, FIG. 2 displays such an outer layer 200, where latex 204 is utilized to attached foam 206 to PU layer 202. In an exemplary embodiment, foam 206 may have a thickness of 4 mm to 5 mm. In an exemplary embodiment, outer layer 200 may have a thickness of 5 mm to 6.5 mm.

In an exemplary embodiment, step 114 may comprise of forming cutouts corresponding to a respective shape for each of the plurality of panels from the outer layer. In an exemplary embodiment, step 114 may be understood in the context of FIGS. 2, 3A, and 3B.

In an exemplary embodiment, as described above, FIG. 2 displays an outer layer 200.

Figure 3A:
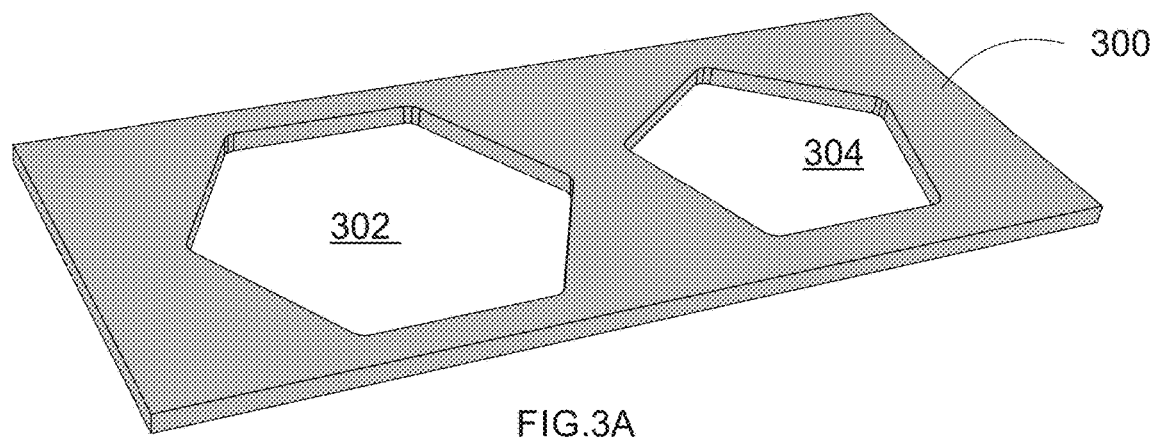
FIGS. 3A-3D are illustrations of exemplary scenarios for cutting out a plurality of PU layer cutouts, consistent with one or more exemplary embodiments of the present disclosure.

In an exemplary embodiment, FIGS. 3A-3D are illustrations of an exemplary scenario for cutting out a plurality of cutouts, according to an embodiment of the present disclosure. As shown in FIG. 3A, required panel shapes 302 and 304 may be cut from layer 300 using conventional ball cutting knives. Alternatively required shapes 302 and 304 may be cut from layer 300 utilizing a laser. In an exemplary embodiment, an exemplary laser may comprise of an exemplary CO2 laser which may be configured to allow for such cutting. In an example embodiment, layer 300 may be an outer layer for panels of a sports ball similar to outer layer 200, consistent with exemplary embodiments of the present disclosure.

Figure 3B:
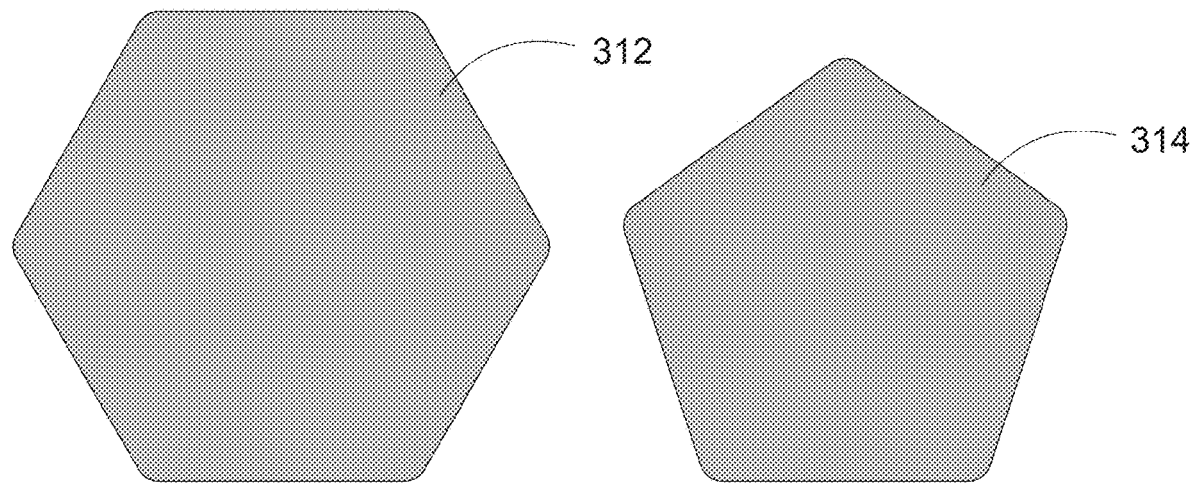

FIG. 3B illustrates exemplary cutouts 312 and 314 that may be cut from outer layer 300, for example from required panel shapes 302 and 304. In this exemplary scenario, cutouts 312 and 314 may represent a cutout of outer layer 300. In an exemplary embodiment, for each respective ball, there may be 24 to 32 cutouts which may all be transformed as explained in context of further steps below to collectively form the outside covering of a sports ball. In an exemplary embodiment, there may be 12 or less cutouts.

Figure 3C:
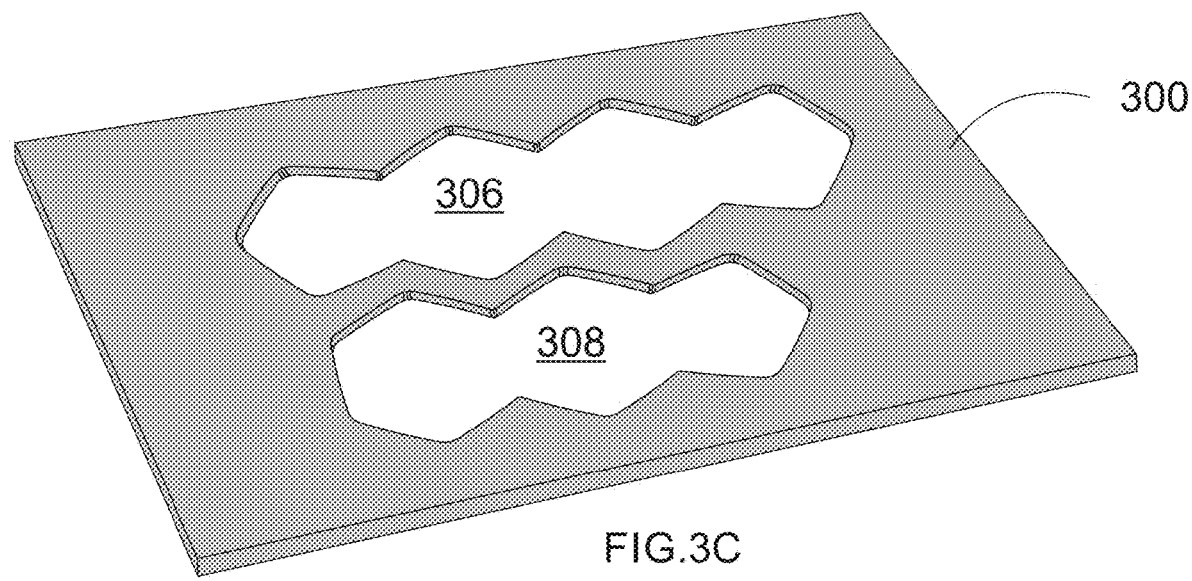

As shown in FIG. 3C, required panel shapes 306 and 308 may be cut from layer 300 using conventional ball cutting knives, similar to as shown in FIG. 3A. Alternatively required shapes 306 and 308 may be cut from layer 300 utilizing a laser, similar to as shown in FIG. 3A.

Figure 3D:
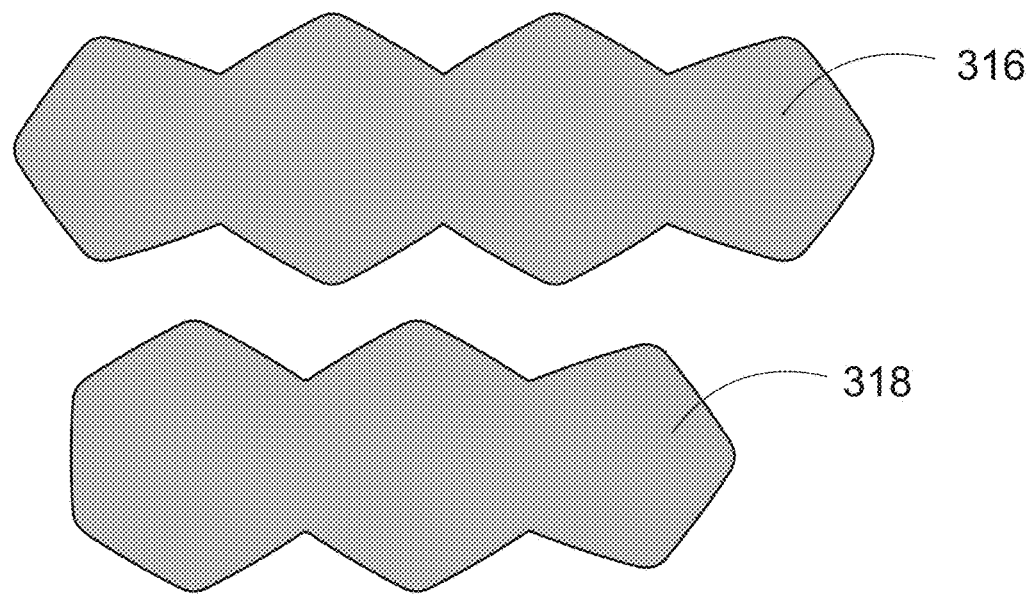

FIG. 3D illustrates exemplary cutouts 316 and 318 that may be cut from outer layer 300, for example from required panel shapes 306 and 308. In this exemplary scenario, cutouts 316 and 318 may represent a cutout of outer layer 300. In an exemplary embodiment, cutout 316 and 318 may be panel shapes which are meant to have an aesthetic look of multiple sports balls panels when in fact they are a singular panel. In an exemplary embodiment, a plurality of these types of panels formed utilizing exemplary cutouts may form a sport ball.

Figure 1C:
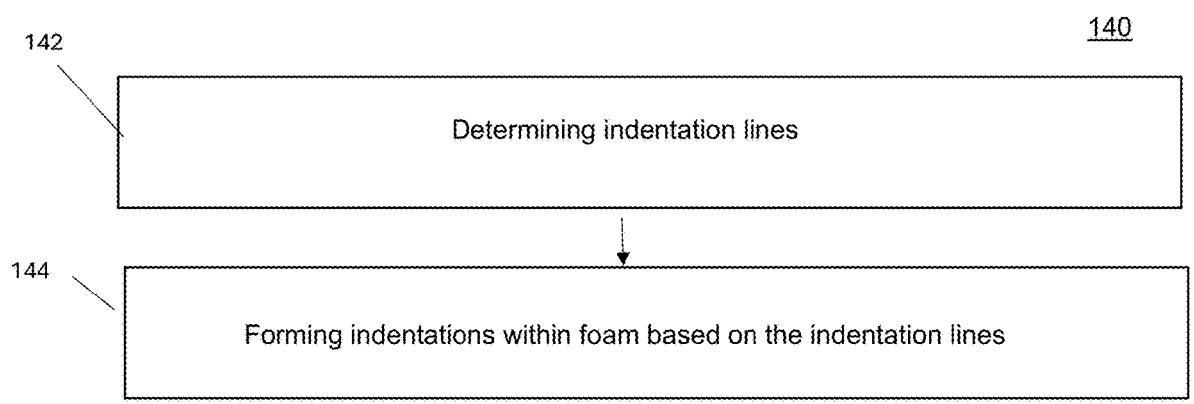
FIG. 1C illustrates an exemplary method for forming indentations on foam, consistent with one or more exemplary embodiments of the present disclosure.

In an exemplary embodiment, method 100 may further comprise of step 116. In an exemplary embodiment, step 116 may comprise of forming pre-mold cutouts by creating one or more foam indentations on each of the respective cutouts by applying a laser to the foam of each respective cutout. In an exemplary embodiment, details of step 116 are provided in FIG. 1C comprising method 140. In an exemplary embodiment, details of method 140 are illustrated in further detail in combination with accompanying description of FIGS. 4A-C, 5A-C, 6A-C, 7A-C, and 8A-C.

In an exemplary embodiment, step 142 may comprise of determining indentation lines. In an exemplary embodiment, indentation lines may comprise of exemplary imaginary (or real) lines on an exemplary surface of exemplary foam where indentations are to be created.

Figure 4A:
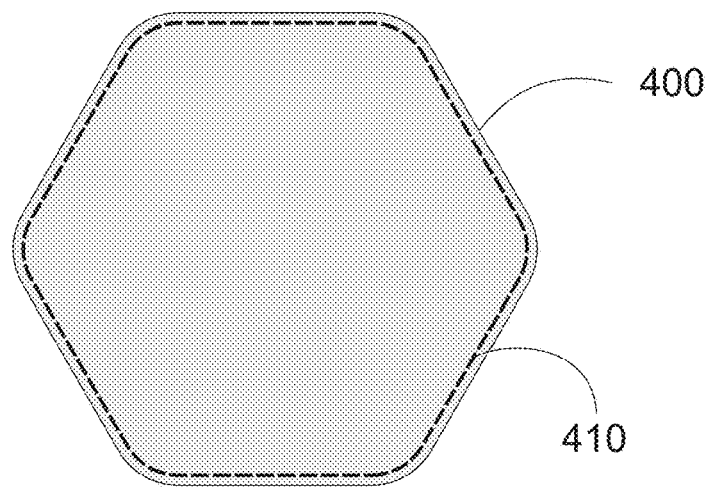
FIGS. 4A-C illustrated various indentation lines as illustrated on an outer layer, consistent with one or more exemplary embodiments of the present disclosure.
Figure 4B:
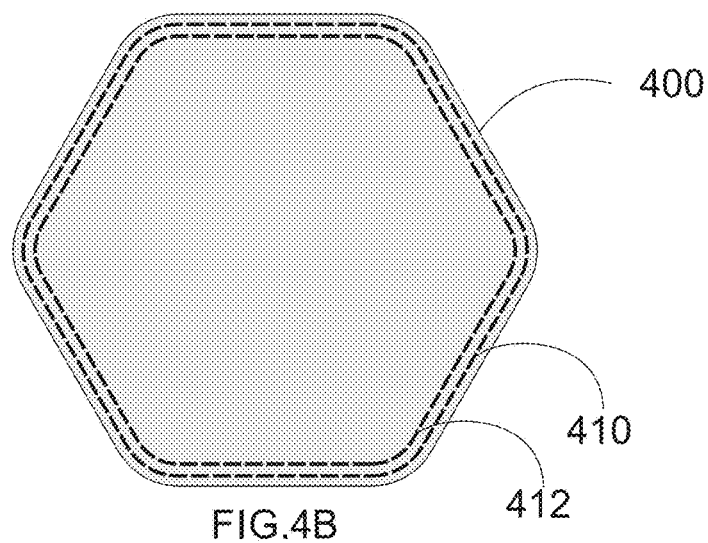
Figure 4C:
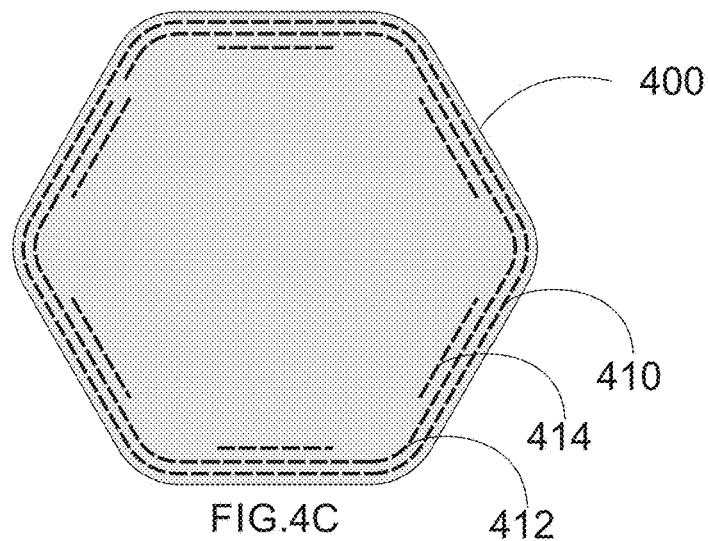

In an exemplary embodiment, FIGS. 4A-C illustrated various indentation lines as illustrated on an outer layer, consistent with one or more exemplary embodiments of the present disclosure. In an exemplary embodiment, FIG. 4A illustrates a singular indentation line 410 on cutout 400 (similar to exemplary cutout 302), while FIG. 4B illustrates respective indentation lines 410 and 412 respectively on cutout 400. In an exemplary embodiment, respective indentation line 410 may be a distance of 1.5 to 2 mm away from exemplary outside edges of cutout 302. In an exemplary embodiment, the distance may be in direction of an exemplary biggest plane of a surface of an exemplary cutout. In an exemplary embodiment, an indentation line 412 may be a distance of 1.5 to 2 mm away from indentation line 410 in a direction away from indentation line away from edges of cutout 302 (or towards the center of cutout 302). In an exemplary embodiment, there may be additional indentation lines, with each a distance from 1.5 to 2 mm from a closest indentation line. In an exemplary embodiment, FIG. 4C illustrates an additional indentation line 414 in addition to indentation lines 410 and 412. In an exemplary embodiment, there may be additional indentation lines included between indentation line 412 and 414, each with a distance of 1.5 to 2 mm. from a previous indentation line. In an exemplary embodiment, indentation line 414 may be parallel to a respective edges of cutout 400 but may be broken up so it may be present for less than two-thirds of a perimeter if it was constantly present.

In an exemplary embodiment, step 144 may comprise of forming indentations within foam based on the indentation lines. In detail, after indentation lines are determined/created, in an exemplary embodiment, an exemplary laser may be utilized to former indentations on an exemplary surface of exemplary foam based on exemplary indentation lines. In an exemplary embodiment, an exemplary laser may comprise of a laser produced by utilizing CO2. In an exemplary embodiment, laser may create an exemplary foam indentation on each of the respective cutouts.

Figure 5A:
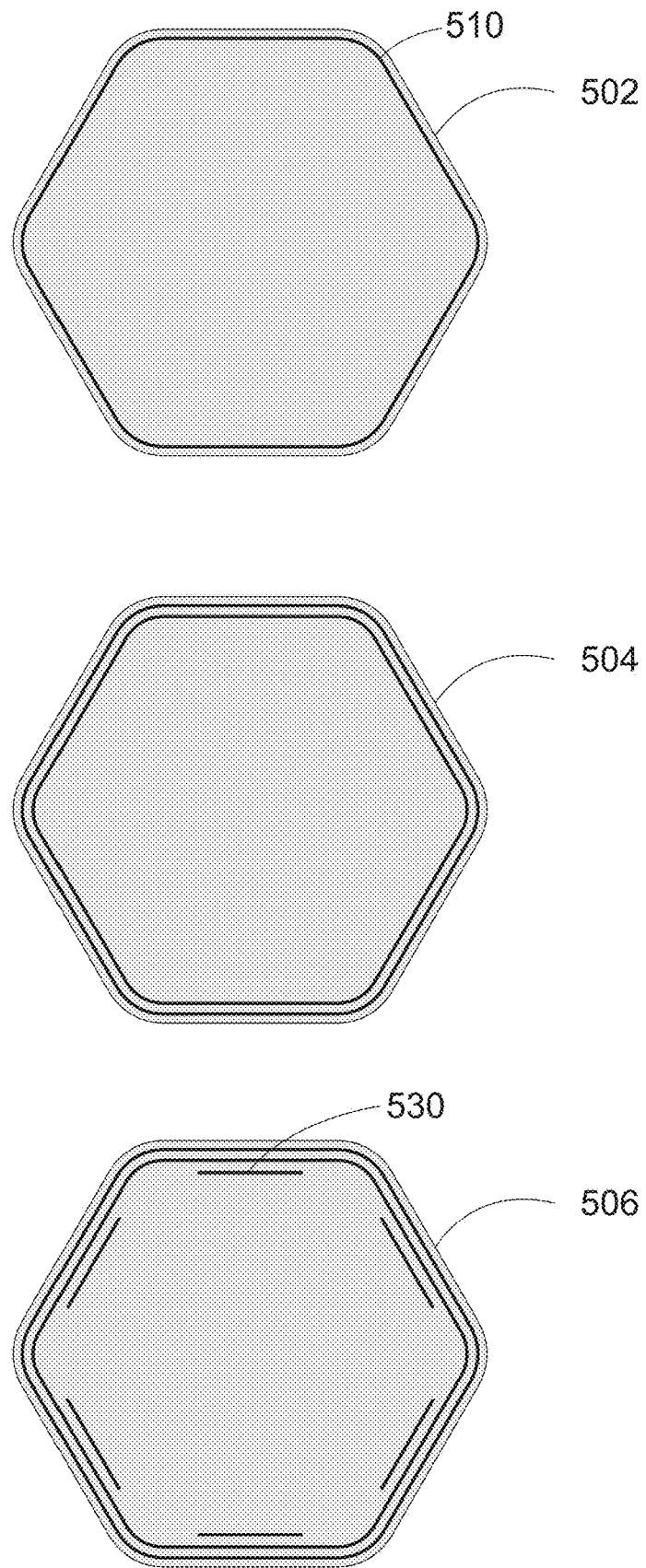
FIG. 5A illustrates three top views of respective pre-mold-cut outs, consistent with one or more exemplary embodiments of the present disclosure.
Figure 5B:
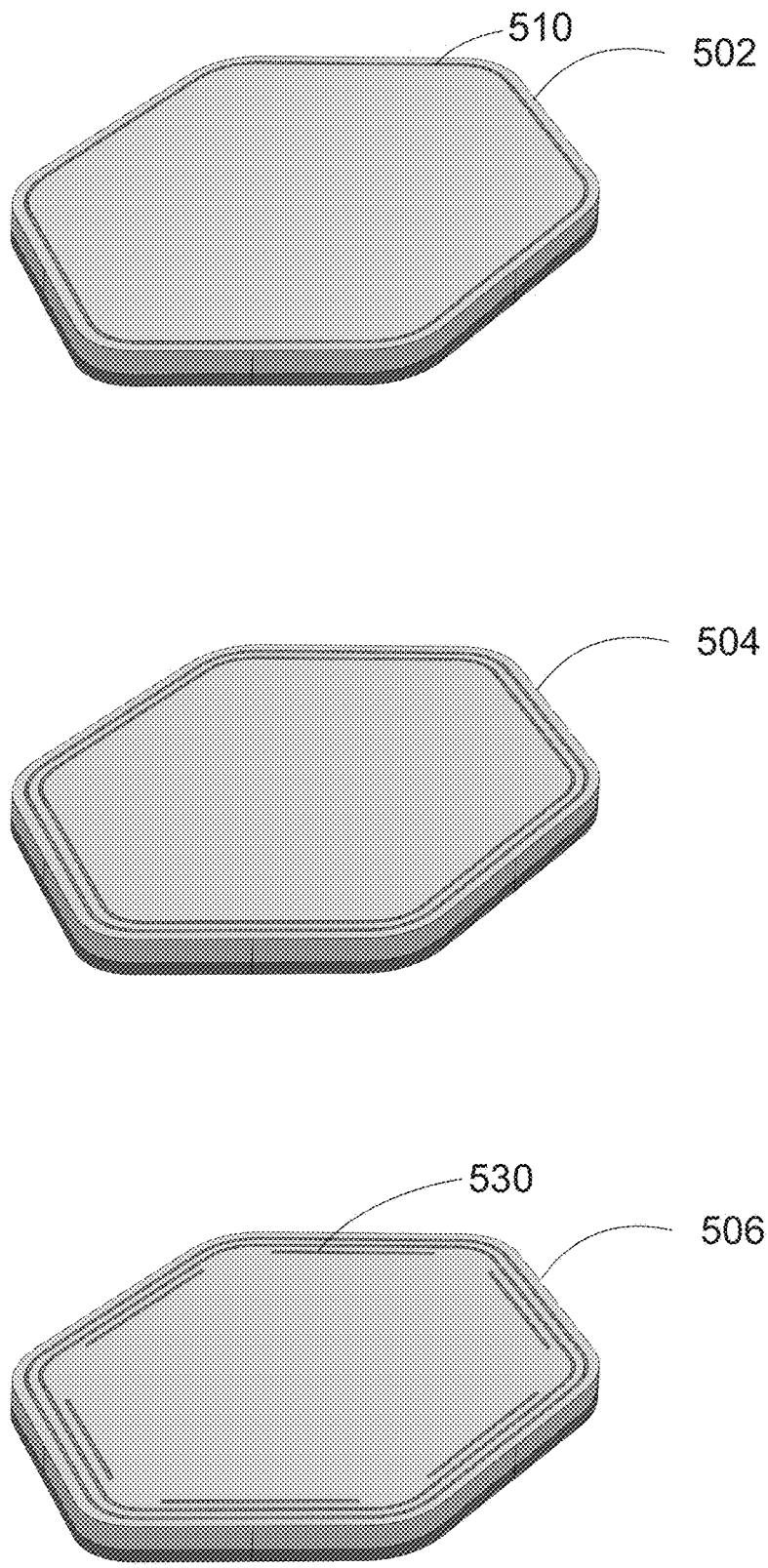
FIG. 5B illustrates perspective views of pre-mold-cut outs, consistent with one or more exemplary embodiments of the present disclosure.
Figure 5C:
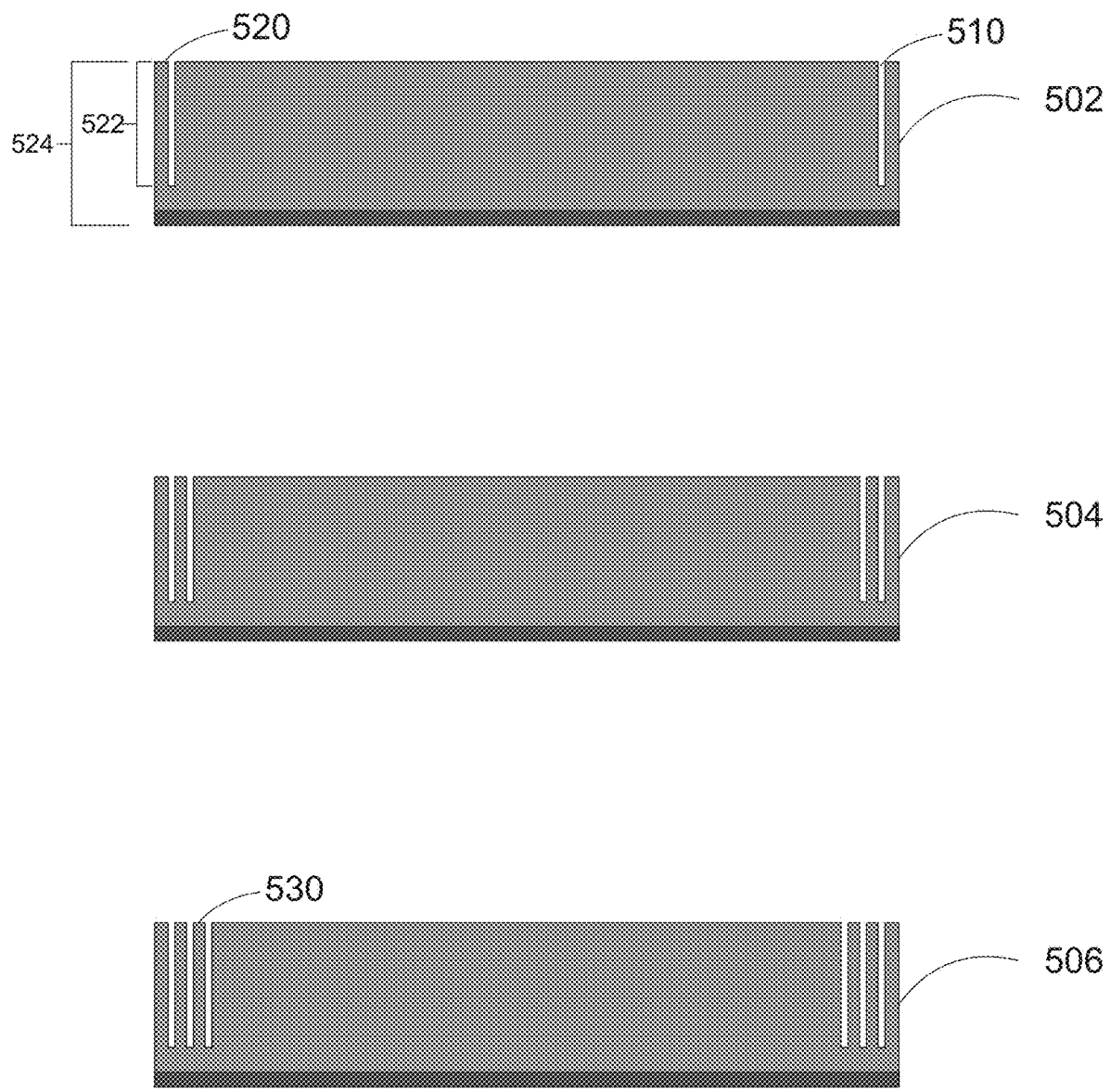
FIG. 5C illustrates cross-section views of pre-mold-cut outs, consistent with one or more exemplary embodiments of the present disclosure.

In an exemplary embodiment, FIG. 5A illustrates three top views of respective pre-mold-cut outs 502, 504, and 506, FIG. 5B illustrates perspective views of pre-mold-cut outs 502, 504, and 506, and FIG. 5C illustrates perspective views of pre-mold-cut outs 502, 504, and 506, consistent with one or more exemplary embodiments of the present disclosure. In an exemplary embodiment, pre-mold cut out 502 illustrates an exemplary scenario in which an indentation was formed at indentation line 410, pre-mold cutout 504 represents an exemplary scenario in which indentations were formed at indentation lines 410 and 412, while pre-mold cutout 506 represents an exemplary scenario in which indentations were formed at indentation lines 410, 412, and 414.

In an exemplary embodiment, indentations illustrated throughout FIGS. 5A-C may have similar properties, but as an illustrative example, indentation 510 from is described in further detail. In an exemplary embodiment, as illustrated in FIG. 5C, an end-to-end distance 520 in a perspective view of an exemplary foam for an indentation 510 may be 0.75 to 1.25 mm. Accordingly, in an exemplary embodiment, diameter of an exemplary laser utilized to make an exemplary indentation may be 0.75 to 1.25 mm (accordingly, an indentation may be made of a same size). In an exemplary embodiment, an indentation may have a depth 522 of up to 3 mm, while the overall thickness 524 of exemplary cutouts may be in a range of 5 mm to 6.5 mm. Accordingly, based on exemplary indentation lines, in an exemplary embodiment, an exemplary indentation may be present a certain distance from edges of a respective cutout through the periphery of exemplary cutout.

In an exemplary embodiment, as illustrated in pre-mold cutouts 504 and 506, there may be multiple indentations, for example, two to four additional indentations which may be a distance of 1.5 to 2 mm from another indentation. In an exemplary embodiment, an exemplary additional indentation may be present only for part of the indentation line, such as pre-mold cutout 506, on an exemplary indentation may have a partial line. That is, indentation 530 may occur with the same width, but on the periphery of exemplary cutout, it may occur for only part of an exemplary indentation line.

In an exemplary embodiment, method 100 may further comprise of step 118. In an exemplary embodiment, step 118 may comprise of placing each of the pre-molds cutouts in respective corresponding mold. In an exemplary embodiment, respective molds may have physical properties based on desired finalized shapes of finalized panels (as discussed in further detail below).

In an exemplary embodiment, method 100 may further comprise of step 120. In an exemplary embodiment, step 120 may comprise of forming each respective panel in each respective corresponding mold by applying pressure utilizing the upper mold portion and applying heat for thirty to forty seconds. In further detail, in an exemplary embodiment, an exemplary upper mold portion may apply downwards force while at the same time, heat may be applied for thirty to forty seconds comprising a temperature of 70 degrees Celsius or more.

Figure 6A:
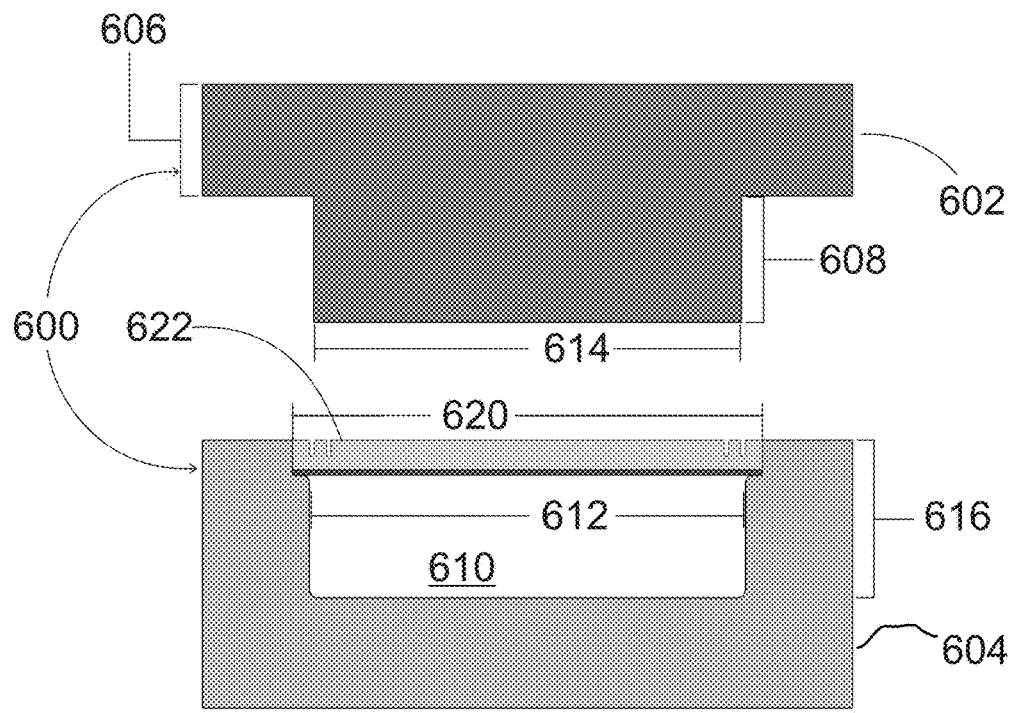
FIGS. 6A and 6B illustrates cross-sections of exemplary mold in two exemplary scenarios, consistent with exemplary embodiments of the present disclosure.
Figure 6B:
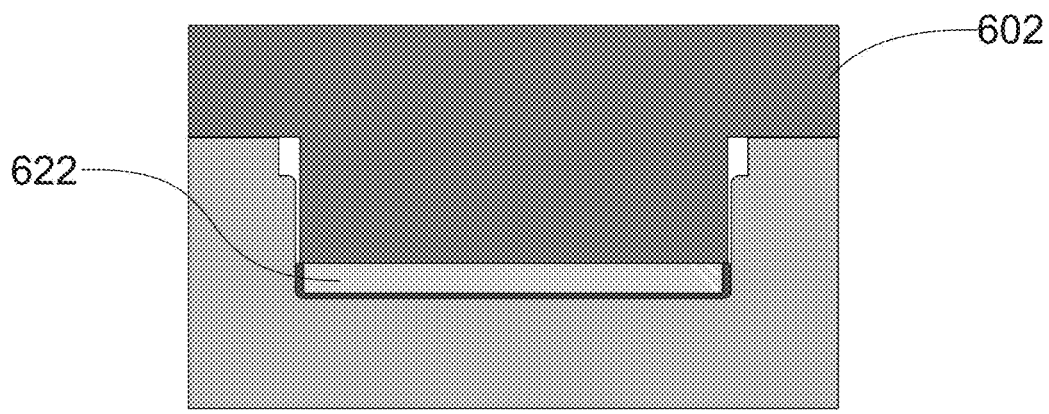

Details of steps 118 and 120 are explained in the context of, 6A, and 6B. In an exemplary embodiment, FIGS. 6A and 6B illustrates cross-sections of exemplary mold 600 in two exemplary scenarios, consistent with exemplary embodiments of the present disclosure. In an exemplary embodiment, FIG. 6A illustrates exemplary mold 600 is illustrated in a pre-pressed state. In an exemplary embodiment, mold 600 may comprise of upper mold portion 602 and a lower mold portion 604. In an exemplary embodiment, exemplary mold 600 may correspond to shape of a desired finalized mold (as discussed in further details below). In an exemplary embodiment, mold 600 may correspond to respective outer layer cutout 302. In an exemplary embodiment, upper mold portion 602 may have a base part 606 and a pressing part 608. In an exemplary embodiment, pressing part 608 may correspond to shape of a desired finalized panel and may also correspond to cavity 610 within lower mold portion 604. In an exemplary embodiment, end-to-end distance 612 of cavity 610 may be at least 0.5 mm more than end-to-end distance 614 of pressing part 608. In an exemplary embodiment, end-to-end distance 612 of cavity 510 may be 77.5 mm and end-to-end distance 614 of pressing part 608 may be 77 mm. This may allow pressing part 608 to be fully enveloped within cavity 612 while applying pressure to exemplary outer layer included within. In an exemplary embodiment, a top part 620 of lower mold portion 604, may have an end-to-end distance of 84.5 mm. Accordingly, an exemplary pre-mold panel 622 with an end-to-end distance of 84.5 may be placed there. As illustrated, in an exemplary embodiment, pre-mold panel 622 may have two respective indentations. In an exemplary embodiment, cavity 610 may have a cavity depth 616 of 22.5 mm. In an exemplary embodiment, pressing part 608 may have a height of 18 mm. Accordingly, when an exemplary outer layer with a thickness of 5 to 6.5 mm is present within cavity 612, pressing part 608 would be able to apply pressure to an exemplary outer layer.

In an exemplary embodiment, FIG. 6B illustrates exemplary mold 600 in a second scenario, consistent with one or more exemplary embodiments of the present disclosure. Specifically, FIG. 6B illustrates mold 600 in a pressed state. Specifically, upper mold portion 602 applies pressure to pre-mold panel 622 while it is contained within lower mold portion 604. In an exemplary embodiment, as upper mold portion 602 applies pressure to pre-mold panel, heat may be further applied by a heat source.

Figure 6C:
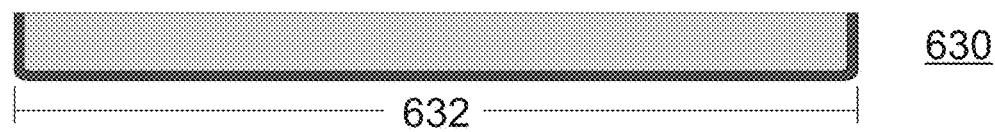
FIG. 6C illustrates a panel formed by utilizing mold 600, consistent with one or more exemplary embodiments of the present disclosure FIGS. 7A and 7B and illustrate a multiple panel mold, consistent with one or more exemplary embodiments of the present disclosure.

In an exemplary embodiment, FIG. 6C illustrates a panel formed by utilizing mold 600, consistent with one or more exemplary embodiments of the present disclosure. In an exemplary embodiment, panel 630 may have an end-to-end distance 632 or 78.5 mm. That is, cavity 614 may have a lesser end-to-end distance than the finally produced panel because after being taken out of an exemplary mold, an exemplary panel may expand close to one millimeter.

In an exemplary embodiment, FIGS. 7A and 7B and illustrate a multiple panel mold, consistent with one or more exemplary embodiments of the present disclosure. In an exemplary embodiment, mold 700 may be a singular panel but may have an appearance of multiple panels. In an exemplary embodiment, FIG. 7A illustrated a side view of mold 700. In an exemplary embodiment, mold 700 may be similar to mold 500, and may comprise of upper mold portion 702 and a lower mold portion 704 which may be functionally and structurally similar to upper mold portion 502 and a lower mold portion 504. In an exemplary embodiment, aesthetic panel bumps 706 may be a plurality of embossing seam protrusions, that is, a part of an exemplary mold which is raised from a lower surface of an exemplary mold allowing for compression to be applied, allowing for exemplary seam lines to be created. In an exemplary embodiment, exemplary seam lines may allow for giving an impression that multiple panels are formed when, in fact, a long elongated singular panel may be present with one singular panel. In an exemplary embodiment, FIG. 7B illustrates a top view of lower mold portion 704.

Figure 8A:
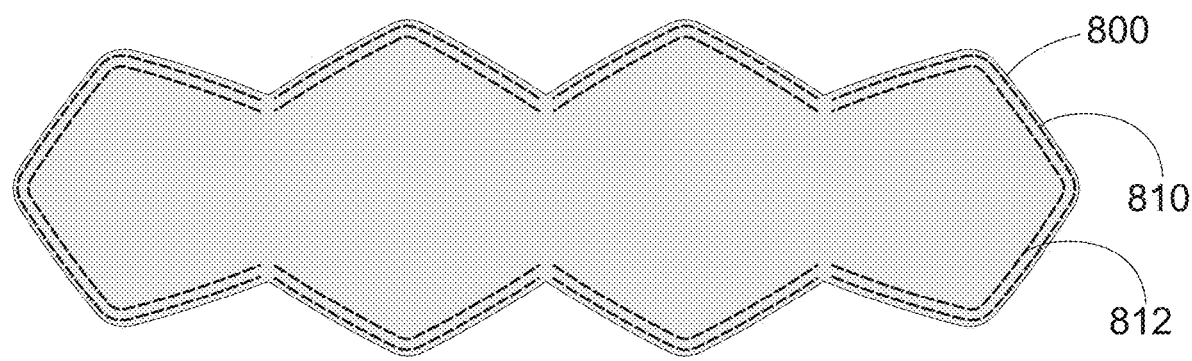
FIGS. 8A and 8B illustrates cutouts that correspond to multiple panel shapes, consistent with one or more exemplary embodiments of the present disclosure.
Figure 8B:
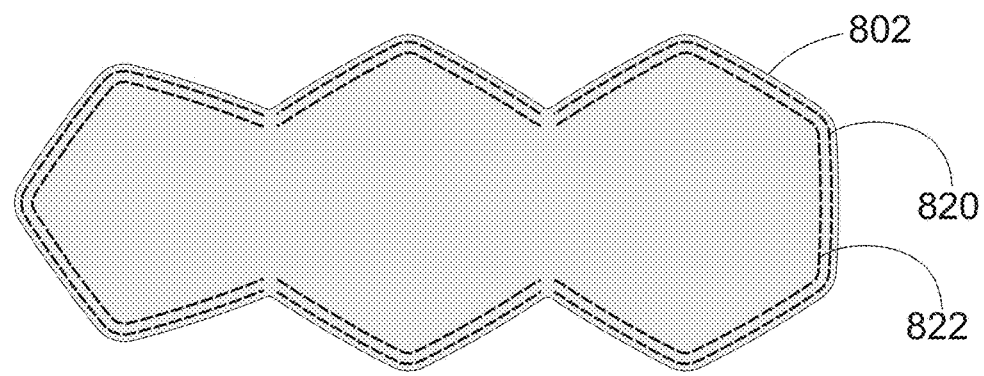

In an exemplary embodiment, FIGS. 8A and 8B illustrate cutouts 800 and 802 which may correspond to multiple panel shapes, consistent with one or more exemplary embodiments. In an exemplary embodiment, cutout 800 may have indentation lines 810 while cutout 802 may have indentation lines 820 and 822. In an exemplary embodiment, there may be additional indentation lines as discussed above in context of FIG. 4A-C.

Figure 9A:
FIGS. 9A and 9B illustrate an exemplary finalized panel which may be produced by utilizing an exemplary mold on exemplary cutout, consistent with one or more exemplary embodiments of the present disclosure.
Figure 9B:
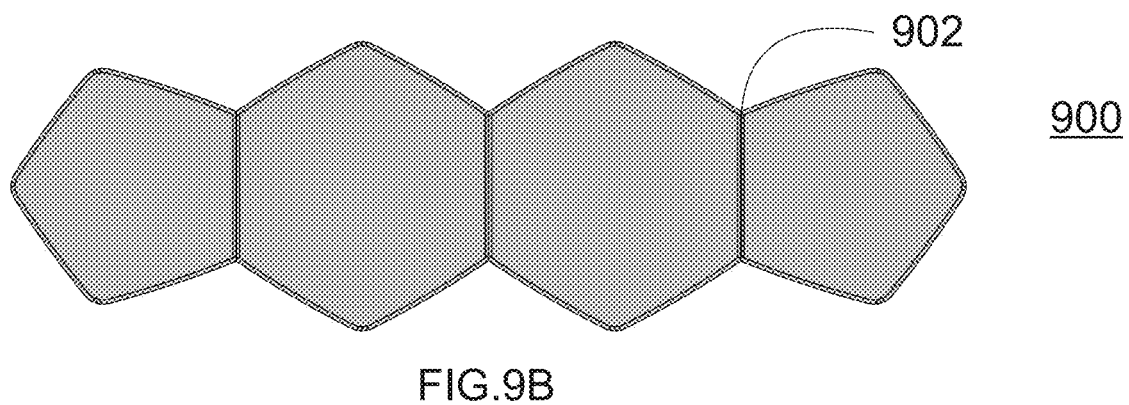

In an exemplary embodiment, FIGS. 9A and 9B illustrate an exemplary finalized panel 900 which may be produced by utilizing mold 700 on exemplary cutout 800, consistent with one or more exemplary embodiments of the present disclosure. In an exemplary embodiment, finalized panel 900 may have indentions 902 that may be created based on indentation lines 810.

In an exemplary embodiment, method 100 may further comprise of step 122. In an exemplary embodiment, step 122 may comprise of creating a bladder valve panel by inserting a valve in one of the plurality of created panels. In further detail, in an exemplary center of an exemplary panel, such as for example, finalized panel 750, a hole may be made into which an exemplary valve may be attached.

Figure 10:
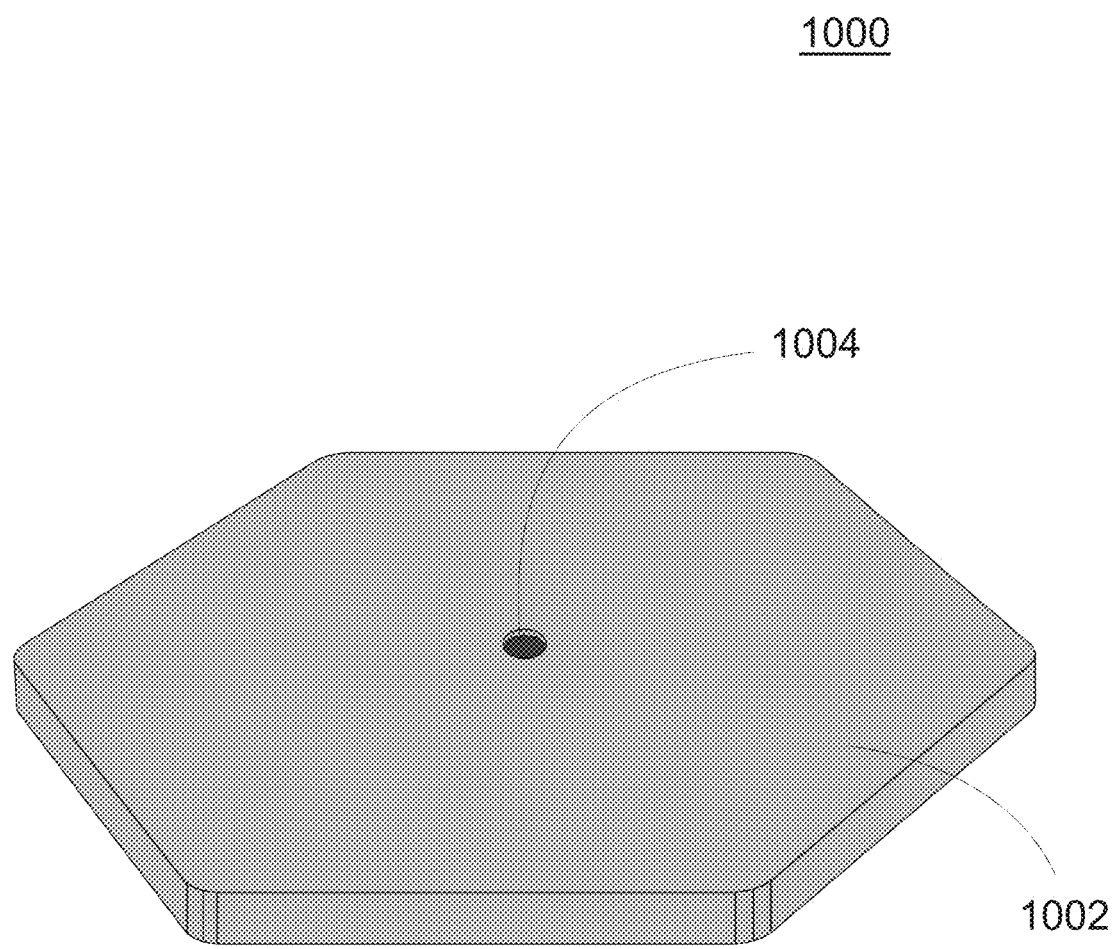
FIG. 10 illustrates exemplary an exemplary bladder valve panel, consistent with exemplary embodiments of the present disclosure.

In an exemplary embodiment, FIG. 10 illustrates exemplary an exemplary bladder valve panel similar to as produced in context of step 122, consistent with exemplary embodiments of the present disclosure. A bladder valve panel may refer to an exemplary panel of a soccer ball that has a bladder attached to it and contains a valve for filling air into the bladder or for deflating the bladder. For example, an exemplary finalized panel 750. For example, FIG. 10, illustrates a bladder valve panel 1000, consistent with exemplary embodiments of the present disclosure. In an exemplary embodiment, a cutout of bladder valve panel 1000 may be similar to finalized panel 750. In further detail to step, 122, first, a cavity may be created in the middle of an exemplary display panel where an exemplary valve may be inserted. In an exemplary embodiment, conventional methods such as punching a hole by hand or by a machine one by one. Accordingly, cavity 1004 may be formed through which an exemplary valve (of an exemplary bladder). Therefore cavity 1004 may be located on bladder valve panel 1000.

Now referring back to method 100, in an exemplary embodiment, method 100 may further comprise step 104 comprising forming a pre-finalized ball by attaching the plurality of the panels including the bladder valve panel to a bladder and respective edges to each of the plurality of the panels to respective edges of adjacent panels of the plurality of the panels. In an exemplary embodiment, further details with respect to step 104 may be clearly illustrated in combination with FIGS. 11A-14C.

Figure 11A:
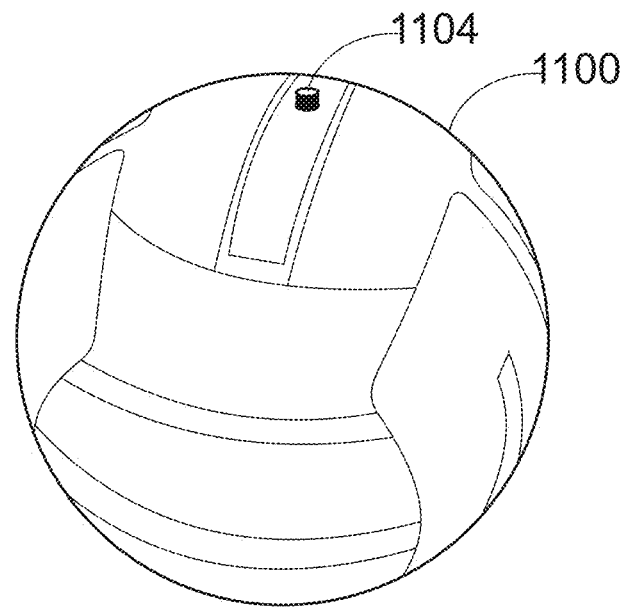
FIGS. 11A and 11B illustrate two exemplary bladders, consistent with exemplary embodiments of the present disclosure.
Figure 11B:
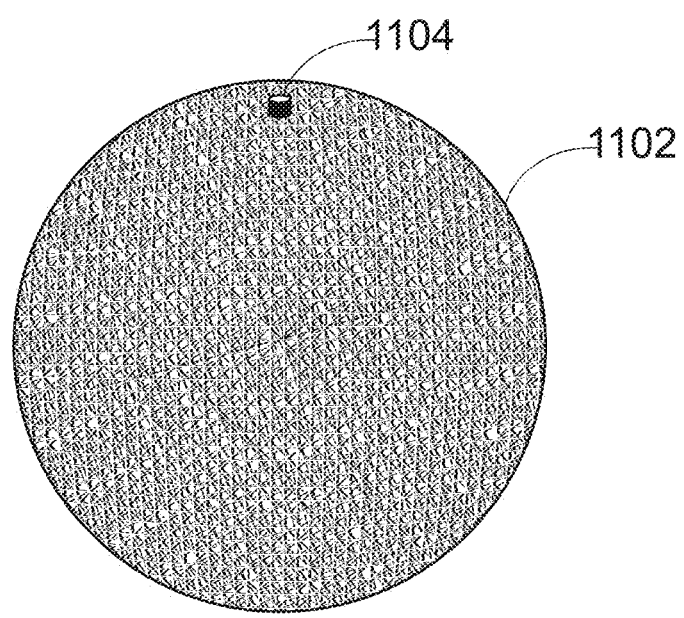

In an exemplary embodiment, FIGS. 11A and 11B illustrate two exemplary bladders 1100 and 1102, consistent with exemplary embodiments of the present disclosure. As illustrated, exemplary bladders 1100 and 1102 are both attached to exemplary valve 1104. In an exemplary embodiment, exemplary bladder valve panel as described in context of step 118 may be attached to this valve.

In an exemplary embodiment, bladder 1100 may comprise a molded rubber or butyl bladder or synthetic rubber that may be laminated with polyester or polyester cotton cloth strips. In an exemplary embodiment, bladder 1102 may comprise a molded rubber or butyl or synthetic rubber that may be wound with polyester or nylon threads. In an exemplary embodiment, additional bladders, with restricted circumference properties may be used. In exemplary embodiments, valve 1104 may be used for inflating or deflating bladders 1100 and 1102. Exemplary bladders aid in providing firmness and roundness to a soccer ball, in addition to serving as an exemplary base on top of which exemplary panels are attached.

Figure 12A:
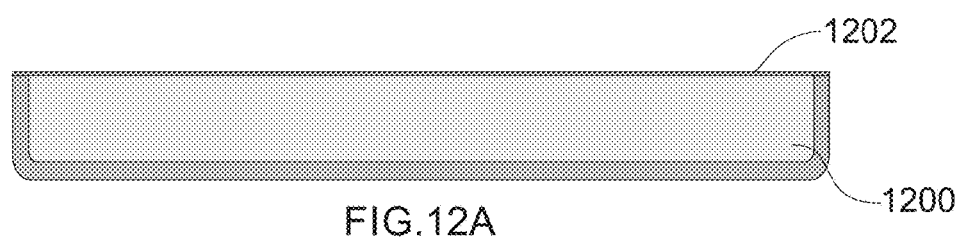
FIGS. 12A-C illustrate cross-sections of exemplary scenarios with exemplary latex or adhesive applied to exemplary finalized panels, consistent with one or more exemplary embodiments of the present disclosure.
Figure 12B:
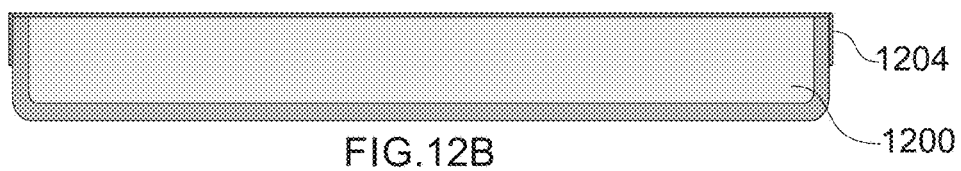
Figure 12C:
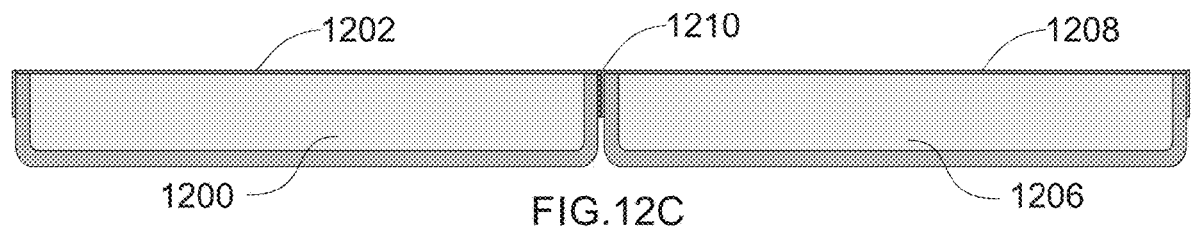

Referring back to details of step 104, referring to attaching the plurality of the panels to a bladder may include attaching a set of panels to an exemplary bladder. In an exemplary embodiment, this may entail applying a latex or an adhesive all around on an outer surface of an exemplary bladder such as bladder 1100 and 1102. In an exemplary embodiment, an exemplary latex may be applied on each finalized panel of the plurality of panels as well. FIGS. 12A-C illustrate cross-sections of exemplary scenarios with exemplary latex or adhesive applied to exemplary finalized panels, consistent with one or more exemplary embodiments of the present disclosure. In an exemplary embodiment, as illustrated in FIGS. 12A, finalized panel 1200 may have adhesive or latex 1202 applied just on an exemplary bottoms surface (side with exemplary foam formed therein) which is meant to be attached to an exemplary bladder (such as bladders 1100 or 1102). In a second exemplary scenario as displayed in FIG. 12B, finalized panel 1200 may have adhesive or latex 1204 applied exemplary bottom surfaces (side of finalized panel with exemplary foam formed therein) and also at least half of the sides of finalized panels encompassing exemplary PU cutouts. In an exemplary embodiment, this may allow for two adjacent finalized panels to be connected with each other, in addition to being connected to an exemplary bladder. In an exemplary embodiment, FIG. 12C illustrated such an exemplary scenario, when finalized panel 1200 with adhesive or latex 1204, may be attached or connected to finalized panels 1206 with adhesive or latex 1208. In an exemplary embodiment, finalized panels 1200 and 1206 may be formed utilizing similar techniques and their edges may correspond to each other. Furthermore, latex and adhesives 120, 1204, and 1206 may be similar in terms of composition but may be applied as illustrated in the respective figures.

In an exemplary embodiment, bladder valve panel would be attached corresponding to an exemplary location of an exemplary valve on an exemplary bladder and remaining plurality of panels would be attached accordingly.

Figure 13A:
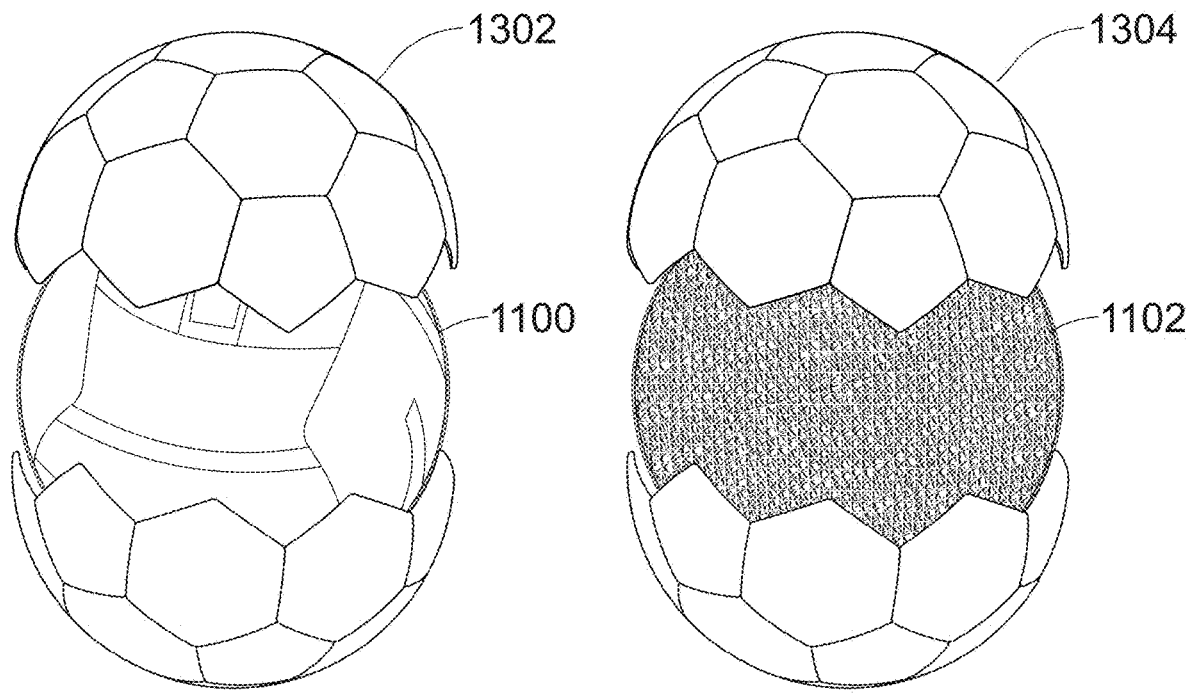
FIGS. 13A and 13B, illustrate exemplary stages of forming a pre-finalized balls, consistent with one or more exemplary embodiments of the present disclosure.
Figure 13B:
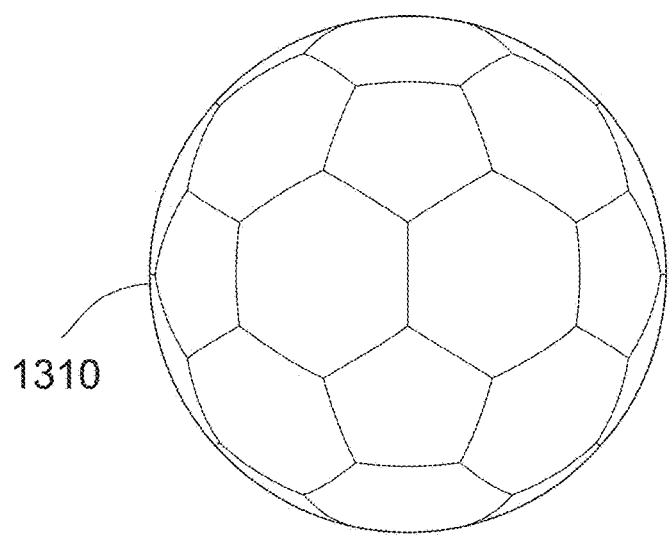

FIGS. 13A and 13B, illustrate exemplary stages of forming a pre-finalized balls, consistent with one or more exemplary embodiments of the present disclosure. In an exemplary embodiment, FIG. 13A illustrates plurality of panels 1302 and plurality of panels 1304 being placed respectively around bladders 1100 and 1102. In an exemplary embodiment, plurality of panels 1302 and 1304 may be exemplary panels formed utilizing step 102 of method 100. For simplicity, plurality of panels 1302 and 1302 are not illustrated displaying the valve panel but one of ordinary skill in the art would comprehend that one of the panels would be an exemplary bladder valve panel.

FIG. 13B displays a finalized ball 1310 that may comprise an internal exemplary bladder with exemplary plurality of panels attached thereon utilizing an exemplary latex or adhesive. In an exemplary embodiment, plurality of panels may also be attached to each other utilizing an exemplary latex or adhesive. In further detail, adhesives may be attached between respective edges of all the plurality of embossed panels. Therefore, in addition to the respective adhesives attaching the respective plurality of panels to an exemplary surface of an exemplary bladder, exemplary plurality of panels may also be attached to each other. In an exemplary embodiment, once all exemplary embossed panels for an exemplary sports ball are attached to an exemplary bladder utilizing an adhesive or glue, a bladder contained within a soccer ball may be completely filled with air.

In an exemplary embodiment, step 106 may comprise placing the pre-finalized sports ball in a mold and applying heat to the pre-finalized sports ball. In an exemplary embodiment, an exemplary pre-finalized sports ball may be placed in a heated molding machine (not shown) which is round in the finalized shape of a soccer ball. Heating under pressure of the inner cover of a molding machine may then be applied to the soccer ball for providing a permanent shape and thermo-bonding all of the elements contained within an exemplary mold for form an exemplary soccer ball.

In an exemplary embodiment, an exemplary soccer ball may be molded at 70 degrees Celsius for thirty seconds to sixty seconds. Accordingly, a total of sixty seconds of heat of 70 degrees Celsius may be applied to the soccer ball. Therefore, an exemplary the ball sets uniformly from outside through the pressure generated owing to the hot mold and inside due to the pressure from the bladder. In an exemplary embodiment, this may aid in providing a permanent shape to a sports ball and strengthen its bond on whole.

Figure 14B:
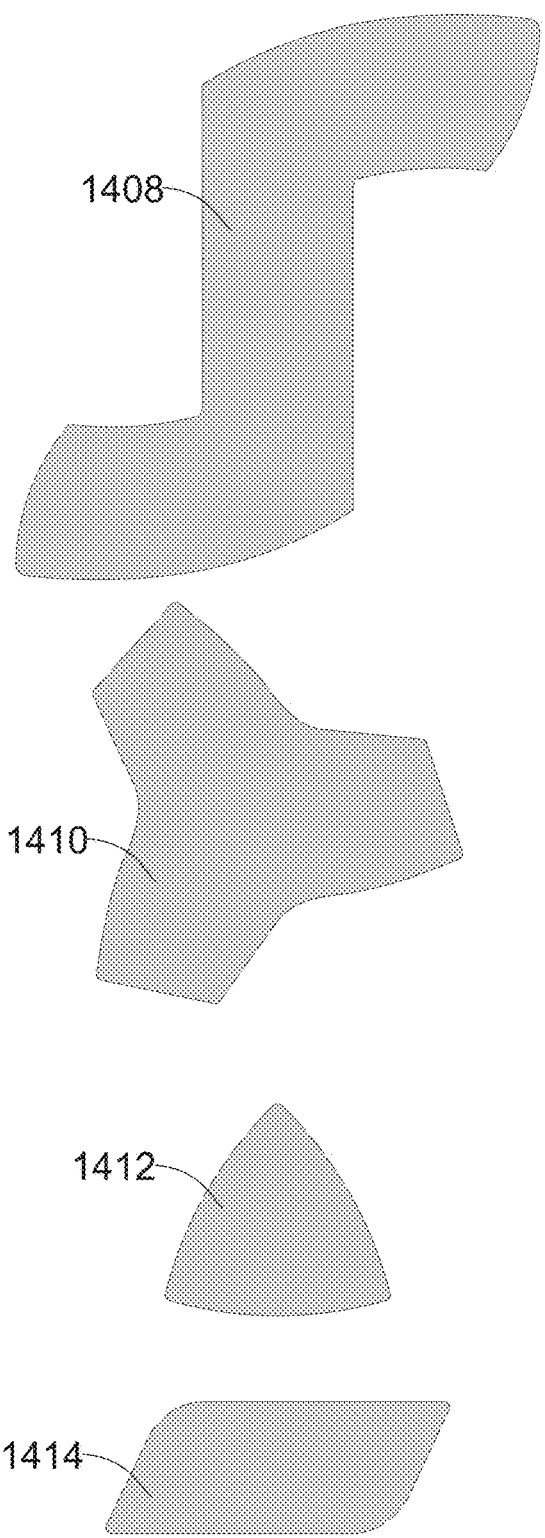

In an exemplary embodiment, one or ordinary skill in the art would comprehend, that an exemplary plurality of panels may not be restricted to shapes as illustrated in some exemplary embodiments, but any combination of individual panels which may form exemplary of plurality of panels which in combination can be attached to exemplary bladders to form a pre-finalized ball. FIGS. 14A-C illustrated exemplary panel shapes that may form an outer covering of an exemplary soccer ball, consistent with one or more exemplary embodiments of the present disclosure. For example, a plurality of exemplary panels with shapes of panels 1402, 1404, and 1406 as illustrated in FIG. 14A may form an exemplary outside covering of an exemplary soccer ball. Similarly, a plurality of exemplary panels with shapes of panels 1408, 14010, 1412, and 1414 as illustrated in FIG. 14B may form an exemplary outside covering of an exemplary soccer ball. Additionally, a plurality of exemplary panels with shapes of panels 1416, 1418, 1420, and 1422 as illustrated in FIG. 14C may form an exemplary outside covering of an exemplary soccer ball. In an exemplary embodiment, each exemplary panel displayed in FIGS. 14A-14C may be formed utilizing step 102 of method 100. Accordingly, an exemplary mold's shape would be similar to required panel shape but the principles as described in exemplary embodiments may remain consistent.

In any exemplary embodiments, any seams in an exemplary ball between exemplary embossed panels may be sealed by application of sealants before or after molding. Exemplary sealants may include polyurethane liquids among others.

In an exemplary embodiment, exemplary soccer balls manufactured according to exemplary methods aid in reducing manufacturing costs significantly, while at the same time, the ball rebounds, has water resistance/absorption, and has abrasion properties that are superior to the characteristics of current hand stitched and thermos-bonded balls. Furthermore, exemplary thermo-bonded balls may allow for intricate designs and graphics to be applied directly to the surface of the ball, resulting in visually appealing and professional appearance.

In an exemplary embodiment, exemplary thermos-bonded panels utilized to form a sport ball utilizing exemplary approaches may be applied in any types of balls that utilize panels and bladders, such as footballs, rugby balls, volleyballs, water polo balls, handballs etc.

What is claimed:

1. A manufacturing method of a sports ball, comprising the steps of:
   forming a plurality of panels (502), comprising:
      forming an outer layer (200) for the plurality of panels, comprising forming the outer layer by attaching foam (206) to a Polyurethane (PU) layer (202);
      forming cutouts (312 and 314) corresponding to a respective shape for each of the plurality of panels from the outer layer (200/300),
      forming pre-mold cutouts (502/622) by creating one or more foam indentations (510) on each of the respective cutouts by removing a part of the foam of each respective cutout of the respective cutouts by applying a laser to the foam of the each respective cutout;
      forming each respective panel of the plurality of panels by:
         placing each of the pre-mold cutouts (622) in a corresponding mold (600), wherein a shape of the corresponding mold corresponds to a shape of a finalized panel, the corresponding mold comprising of an upper mold portion (602) and a lower mold portion (604), the lower mold portion (604) comprising a cavity (610) in a desire shape of a respective panel, the upper mold portion (602) comprising a pressing part (608) corresponding to shape of the cavity (610), wherein each of the pre-mold cutouts (622) with an end-to-end length (620) of more than five millimeters more than an end-to-end length (614) of the pressing part (608); and
         forming each respective panel (630) in each respective corresponding mold by applying pressure to each of the pre-mold cutouts utilizing the upper mold portion (602) and applying heat for thirty to forty seconds, wherein each respective panel (630) with an end-to-end length (632) of one millimeters more than an end-to-end length (614) of the pressing part (608);
      creating a bladder valve panel (1000) by inserting a valve (1104) in one of the plurality of panels;
   forming a pre-finalized ball by attaching the plurality of the panels (1302) including the bladder valve panel to a bladder (1300) and respective edges to each of the plurality of the panels to respective edges of adjacent panels of the plurality of the panels; and
   placing the pre-finalized sports ball (1310) in a ball mold and applying heat to the pre-finalized sports ball, wherein the applying heat to the pre-finalized sports ball comprises applying 70 degrees Celsius for thirty seconds to sixty seconds.

2. A manufacturing method of a sports ball, comprising the steps of:
   forming a plurality of panels (502), comprising:
      forming an outer layer (200) for the plurality of panels, comprising forming the outer layer by attaching foam (206) to a Polyurethane (PU) layer (202);
      forming cutouts (312 and 314) corresponding to a respective shape for each of the plurality of panels from the outer layer (200/300),
      forming pre-mold cutouts (502/622) by creating one or more foam indentations (510) on each of the respective tive cutouts by removing a part of the foam of each respective cutout of the respective cutouts by applying a laser to the foam of each respective cutout;

forming each respective panel of the plurality of panels by:

placing each of the pre-mold cutouts (622) in a corresponding mold (600), wherein a shape of the corresponding mold corresponds to a shape of a finalized panel, the corresponding mold comprising of an upper mold portion (602) and a lower mold portion (604) the lower mold portion comprising a cavity (610), in a desired shape of a respective panel, the upper mold portion (602) comprising a pressing part (608) corresponding to shape of the cavity (610)), wherein each of the pre-mold cutouts (622) with an end-to-end length (620) more than an end-to-end length (614) of the pressing part (608); and forming each respective panel in each respective corresponding mold by applying pressure to each of the pre-mold cutouts utilizing the upper mold portion (602) and applying heat;

creating a bladder valve panel (1000) by inserting a valve (1104) in one of the plurality of created panels;

forming a pre-finalized ball by attaching the plurality of the panels (1302) including the bladder valve panel to a bladder (1300) and respective edges to each of the plurality of the panels to respective edges of adjacent panels of the plurality of the panels; and placing the pre-finalized sports ball (1310) in a ball mold and applying heat to the pre-finalized sports ball.

3. The method of claim 2, wherein forming pre-mold cutouts by creating the one or more foam indentations on each of the respective cutouts by applying the laser to the foam of each respective cutout comprises:

forming a first indentation line a distance of 1.5 to 2 mm from an edge of each respective cutout; and applying the laser of up to 0.75 mm diameter at the first indentation line.

4. The method of claim 3, wherein forming pre-mold cutouts by creating the one or more foam indentations on each of the respective cutouts comprises two or more foam indentations (510 and 530).

5. The method of claim 2, wherein each respective panel with an end-to-end length of one millimeter more than an end-to-end length of the pressing part.

6. The method of claim 2, further comprising forming the bladder by wrapping a rubber bladder with a fabric or yarn.

7. The method of claim 2, wherein forming pre-mold cutouts by creating the one or more foam indentations on each of the respective cutouts by applying the laser to the foam of each respective cutout comprises:

forming a first indentation line in a shape of the respective cutout from a top-perspective a distance of 1.5 to 2 mm from an edge of each respective cutout; and applying the laser of up to 0.75 mm diameter at the first indentation line.

* * * * *